(12) United States Patent
Taguchi

(10) Patent No.: US 7,151,766 B1
(45) Date of Patent: Dec. 19, 2006

(54) RADIO COMMUNICATION APPARATUS USED IN CDMA COMMUNICATION SYSTEM AND POWER CONSUMPTION CONTROL METHOD THEREFOR

(75) Inventor: Motoyasu Taguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1204 days.

(21) Appl. No.: 09/611,308

(22) Filed: Jul. 6, 2000

(30) Foreign Application Priority Data

Jul. 6, 1999 (JP) ................................. 11-191287

(51) Int. Cl.
*H04B 7/216* (2006.01)

(52) U.S. Cl. .................. 370/342; 370/479; 375/150

(58) Field of Classification Search .............. 370/342, 370/335, 320, 477, 441, 208, 209, 207, 503, 370/514, 479; 375/200, 208, 203, 210, 134, 375/136, 150, 147; 455/132

See application file for complete search history.

(56) References Cited

U.S. PATENT DOCUMENTS

| | | | | |
|---|---|---|---|---|
| 4,007,330 A | * | 2/1977 | Winters ...................... | 375/330 |
| 5,742,636 A | * | 4/1998 | Fukushi ...................... | 375/130 |
| 5,793,796 A | * | 8/1998 | Hulbert et al. .............. | 375/150 |
| 5,802,101 A | * | 9/1998 | Maruyama .................. | 375/141 |
| 6,014,373 A | * | 1/2000 | Schilling et al. ............ | 370/342 |
| 6,067,293 A | * | 5/2000 | Shoji .......................... | 370/342 |
| 6,075,807 A | * | 6/2000 | Warren et al. ............... | 375/143 |
| 6,108,548 A | * | 8/2000 | Furukawa et al. .......... | 455/442 |
| 6,137,788 A | * | 10/2000 | Sawahashi et al. ......... | 370/342 |
| 6,157,687 A | * | 12/2000 | Ono ........................... | 375/347 |
| 6,192,040 B1 | * | 2/2001 | Jalloul et al. ............... | 370/335 |
| 6,195,551 B1 | | 2/2001 | Kim et al. | |
| 6,208,632 B1 | * | 3/2001 | Kowalski et al. ........... | 370/335 |
| 6,282,229 B1 | * | 8/2001 | Aoyama ...................... | 375/130 |
| 6,330,271 B1 | * | 12/2001 | Klang et al. ................ | 375/134 |
| 6,333,934 B1 | * | 12/2001 | Miura ......................... | 370/441 |
| 6,370,397 B1 | * | 4/2002 | Popovic et al. ............. | 455/561 |
| 6,373,878 B1 | * | 4/2002 | Palenius et al. ............ | 375/136 |
| 6,385,232 B1 | * | 5/2002 | Terashima ................... | 375/149 |
| 6,414,946 B1 | * | 7/2002 | Satou et al. ................. | 370/328 |
| 6,490,461 B1 | * | 12/2002 | Muller ........................ | 455/522 |
| 6,567,462 B1 | * | 5/2003 | Brunner et al. ............. | 375/148 |
| 6,597,674 B1 | * | 7/2003 | Obuchi et al. .............. | 370/331 |
| 6,600,907 B1 | * | 7/2003 | Taguchi ...................... | 455/132 |

(Continued)

FOREIGN PATENT DOCUMENTS

EP 0785621 * 7/1997

(Continued)

OTHER PUBLICATIONS

Patent Abstracts of Japan, vol. 1999, No. 9, Jul. 30, 1999 (corresponds to JPA 11-113042, published Apr. 23, 1999 with Abstract).

(Continued)

*Primary Examiner*—Hassan Kizou
*Assistant Examiner*—Jay P. Patel
(74) *Attorney, Agent, or Firm*—Sughrue Mion, PLLC

(57) ABSTRACT

A radio communication apparatus used in a CDMA communication system includes a plurality of delay profile circuits for generating delay profiles by calculating the correlations between a reception signal and known data at a plurality of timings, and timing circuits prepared for the respective delay profile circuits to generate correlation timings therein. In this apparatus, the operation of at least the delay profile circuit which generated the delay profile or the timing circuit for generating a correlation timing in the delay profile circuit is stopped in accordance with the correlation value of the delay profile. A power consumption control method for the radio communication apparatus is also disclosed.

23 Claims, 15 Drawing Sheets

U.S. PATENT DOCUMENTS

| | | | |
|---|---|---|---|
| 6,628,700 B1 * | 9/2003 | Miura | 375/148 |
| 6,647,005 B1 * | 11/2003 | Cao et al. | 370/342 |
| 6,707,844 B1 * | 3/2004 | Imaizumi et al. | 375/148 |
| 6,748,015 B1 * | 6/2004 | Kohli et al. | 375/150 |
| 6,788,734 B1 * | 9/2004 | Kober et al. | 375/148 |
| 6,801,565 B1 * | 10/2004 | Bottomley et al. | 375/148 |
| 6,876,665 B1 * | 4/2005 | Schilling et al. | 370/441 |
| 6,940,840 B1 * | 9/2005 | Ozluturk et al. | 370/335 |
| 2002/0093932 A1 * | 7/2002 | Lomp et al. | 370/342 |

FOREIGN PATENT DOCUMENTS

| | | |
|---|---|---|
| EP | 0 884 856 A2 | 12/1998 |
| EP | 0 924 868 A1 | 6/1999 |
| JP | 8-163079 | 6/1996 |
| JP | 8-307428 | 11/1996 |
| JP | 9-200177 | 7/1997 |
| JP | 11-220774 A | 8/1999 |
| JP | 2000-138654 A | 5/2000 |
| JP | 2000-174729 A | 6/2000 |
| JP | 2000-101549 * | 7/2000 |
| JP | 2001-024552 A | 1/2001 |
| WO | WO 97/06648 A1 | 2/1997 |
| WO | WO 98/36588 A2 | 8/1998 |

OTHER PUBLICATIONS

RAN-WGI: "S1.15 VO.10 Measurements (FDD)" Technical Specification Group, Radio Access Network, Mar. 2-4, 1999, pp. 1-20.

* cited by examiner

RADIO COMMUNICATION APPARATUS USED IN CDMA COMMUNICATION SYSTEM AND POWER CONSUMPTION CONTROL METHOD THEREFOR

BACKGROUND OF THE INVENTION

1. Field of the Invention

The present invention relates to a radio communication apparatus and a power consumption control method therefor and, more particularly, to a radio communication apparatus used as a mobile station in a mobile communication system and used in a CDMA communication system to receive signals from a plurality of CDMA transmitters as in handover operation, and a power consumption control method therefor.

2. Description of the Prior Art

Recently, mobile communication systems such as a system using portable telephones have become widespread. One of the communication schemes used by such mobile communication systems is CDMA (Code Division Multiple Access).

According to CDMA, on the transmitting side, data is spread by using one of predetermined spreading codes which differ depending on the data to be transmitted, and the spread data is transmitted. On the receiving side, the data is obtained by spreading (so-called despreading) the reception signal by using a spreading code identical to the one used on the transmitting side (to be precise, a code complex conjugate to the spreading code on the transmitting side). In such communication based on CDMA, the peak correlation value of a signal received on the receiving side is found out by shifting the despreading timing, thereby regenerating the signal transmitted from the transmitting side.

Owing to demands for high portability and the like, mobile stations in a mobile communication system using portable telephones or the like are required to be smaller and lighter and to be used for a long period of time. For this reason, built-in batteries for driving mobile stations are also reduced in size. In order to allow mobile stations to operate on such compact batteries for a long period of time, it is important to reduce the power consumption of the mobile stations.

The CDMA receiver disclosed in Japanese Unexamined Patent Publication No. 9-200177 is as an example of a technique of reducing the power consumption of a CDMA receiver. This CDMA receiver is designed to reduce the power consumption of a correlation filter for despreading a reception signal.

FIG. 1 is a block diagram showing a correlation filter used in the CDMA receiver disclosed in Japanese Unexamined Patent Publication No. 9-200177.

As shown in FIG. 1, this correlation filter is comprised of a delay circuit 51, weighting/combining circuit 52, timing control circuit 53, and switch element 54.

The delay circuit 51 is used to delay an input signal. When an input signal is a digital signal, the delay circuit 51 is formed by, for example, a shift register. When an input signal is analog signal, the delay circuit 51 is formed by, for example, a delay line or analog shift register.

The weighting/combining circuit 52 is prepared in correspondence with tap outputs TP1 to TPn and comprised of a plurality of weighting circuits for multiplying the tap outputs TP1 to TPn by weighting factors W1 to Wn and a combining circuit for combining output signals from the respective weighting circuits and outputting the resultant signal.

The timing control circuit 53 controls the operation of the switch element 54 on the basis of a correlation output signal obtained from the weighting/combining circuit 52. The switch element 54 is kept closed for a predetermined period of time in accordance with a control signal from the timing control circuit 53 so as to apply a power supply voltage from a power supply 55 to the weighting/combining circuit 52.

The weighting/combining operation of the weighting/combining circuit 52 is equivalent to detecting the correlations between the input signal and weighting factors W1 to Wn. In the CDMA receiver disclosed in Japanese Unexamined Patent Publication No. 9-200177, since the correlation results do not exhibit peaks in all parts of the input signal, the supply of power to the weighting/combining circuit 52 is stopped during periods corresponding to parts other than the parts in which the correlation results exhibit peaks, thereby reducing power consumption.

In the CDMA mobile communication system, when a mobile station moves from the cell covered by a given base station to the cell covered by another base station, the mobile station performs a handover, i.e., switching to another base station from which signals are to be received, after a period of time during which signals from two base stations are received.

For example, in this handover operation, the mobile station must receive signals from a plurality of base stations and demodulate the signals. This increases power consumption.

According to a conventional technique like the CDMA receiver disclosed in Japanese Unexamined Patent Publication No. 9-200177, however, no consideration is given to a reduction in power consumption in handover operation, and hence a large amount of power is still consumed in handover operation.

In the conventional technique, no consideration is given to a reduction in power consumption in an arrangement in which a CDMA receiver receives signals from a plurality of CDMA transmitters, i.e., a site diversity arrangement or the like, in addition to a reduction in power consumption in handover operation.

SUMMARY OF THE INVENTION

The present invention has been made in consideration of the above point, and has as its object to provide a radio communication apparatus used in a CDMA communication system, which can reduce its power consumption when receiving signals from a plurality of CDMA transmitters as in handover operation, and a power consumption control method for the radio apparatus.

In order to achieve the above object, according to the first main aspect of the present invention, there is provided a radio communication apparatus in a CDMA communication system which has a plurality of delay profile circuits for generating delay profiles by calculating correlations between a reception signal and known data at a plurality of timings, and timing circuits which are respectively prepared for the delay profile circuits and generate correlation timings in the delay profile circuits, wherein operation of at least one of the delay profile circuit which generated the delay profile and the timing circuit for generating a correlation timing in the delay profile circuit is stopped in accordance with a correlation value of the delay profile.

In the radio communication apparatus according to the first main aspect, the plurality of delay profile circuits are used to simultaneously receive signals from a plurality of CDMA transmitters, and the above operation is stopped during handover operation of switching from one of the plurality of CDMA transmitters to another CDMA transmitter.

In the radio communication apparatus according to the first main aspect, when the largest correlation value of the delay profile is smaller than a predetermined threshold, the above operation is stopped.

In the radio communication apparatus according to the first main aspect, when the number of delay profile circuits is represented by N (N is a natural number satisfying 2<N), and largest correlation values of delay profiles respectively generated by the plurality of delay profile circuits are represented by Pb(N), Pb(N−1), . . . , Pb(1) in decreasing order of values, the above operation is stopped if (Pb(N)−Pb(i)) or (Pb(i)−Pb(i−1)) (i is a natural number satisfying 1≦i<N) is larger than a predetermined threshold.

In the radio communication apparatus according to the first main aspect, a predetermined period of time during which operation of the delay profile circuit is stopped is a natural number multiple of a length of a radio frame of a reception signal.

In the radio communication apparatus according to the first main aspect, the above operation is stopped by stopping supplying an operation clock or power to at least one of the delay profile circuit and the timing circuit.

According to a preferable aspect of the present invention, there is provided a radio communication apparatus used in a CDMA communication system, comprising an antenna for receiving signals from base stations, a radio circuit for performing quadrature detection and modulation with respect to the signals received through the antenna, a plurality of delay profile circuits for obtaining delay profiles by calculating correlations between the signals from the radio circuit and known data, a searcher circuit for selecting a delay profile exhibiting a large correlation value from the plurality of delay profiles obtained by the delay profile circuits, and outputting a signal on which a despreading timing is based, a plurality of timing circuits for outputting pulse signals representing correlation timings in the delay profile circuits on the basis of the signal from the searcher circuit, a CPU for controlling operations of the delay profile circuits and the timing circuits, and an operation clock generating circuit for generating and outputting operation clocks for operating the delay profile circuits and the timing circuits, wherein when a largest correlation value of the delay profile is smaller than a predetermined threshold, a stop request signal for stopping operation of the delay profile circuit that generated the delay profile is output from the searcher circuit to the CPU, and the CPU performs control to stop operation of at least one of the delay profile circuit and the timing circuit corresponding thereto upon receiving the stop request signal.

In the radio communication apparatus according to the above aspect, when a predetermined period of time has elapsed after the searcher circuit outputs the stop request signal, the searcher circuit stops outputting the stop request signal.

In order to achieve the above object, according to the second main aspect of the present invention, there is provided a power consumption control method for a radio communication apparatus which is used in a CDMA communication system and has a plurality of delay profile circuits for generating delay profiles by calculating correlations between a reception signal and known data at a plurality of timings and timing circuits prepared for the respective delay profile circuits to generate correlation timings therein, comprising the comparison step of comparing a largest correlation value of the delay profile with a predetermined threshold, and the stop step of stopping operation of the delay profile circuit on the basis of the comparison result obtained in the comparison step.

As is obvious from the respective aspects described above, according to the present invention, there are provided a radio communication apparatus used in a CDMA communication system, which can reduce its power consumption when receiving signals from a plurality of CDMA transmitters as in handover operation, and a power consumption control method for the radio apparatus.

As an example of numerical values, each delay profile circuit consumes a current of about 134 mA. In this case, by stopping one base station delay profile circuit, the current consumption can be reduced by a current of about 48 mA.

According to the present invention, since the operations of delay profile circuits are stopped in accordance with predetermined conditions for correlation values, the power consumption can be suppressed low as compared with the conventional CDMA scheme.

Furthermore, according to the present invention, since a searcher circuit and CPU, which are also used in the conventional CDMA scheme, are used to check whether to stop the operations of delay profile circuits, no special hardware is required.

The above and many other objects, features and advantages of the present invention will become manifest to those skilled in the art upon making reference to the following detailed description and the accompanying drawings in which preferred embodiments incorporating the principle of the present invention are shown by way of illustrative examples.

DETAILED DESCRIPTION OF THE PREFERRED EMBODIMENTS

A few preferred embodiments of the present invention will be described below with reference to the accompanying drawings.

In the embodiment described below, the present invention is applied to a mobile station in a CDMA mobile communication system. The following embodiment exemplifies the case wherein power consumption is reduced in handover operation.

Figure 1:
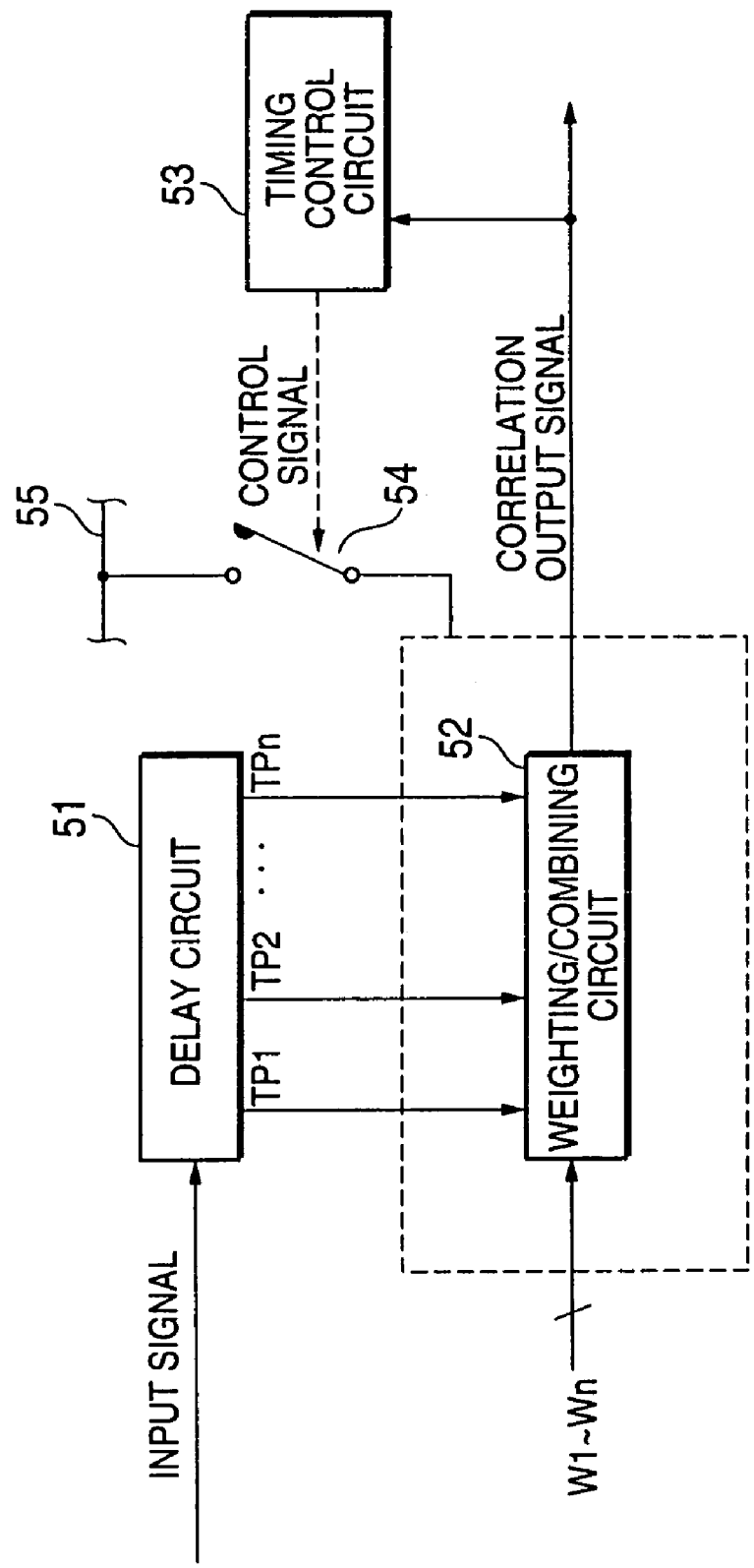
FIG. 1 is a block diagram showing the arrangement of a correlation filter as a conventional power consumption reducing device in a CDMA receiver.
Figure 2:
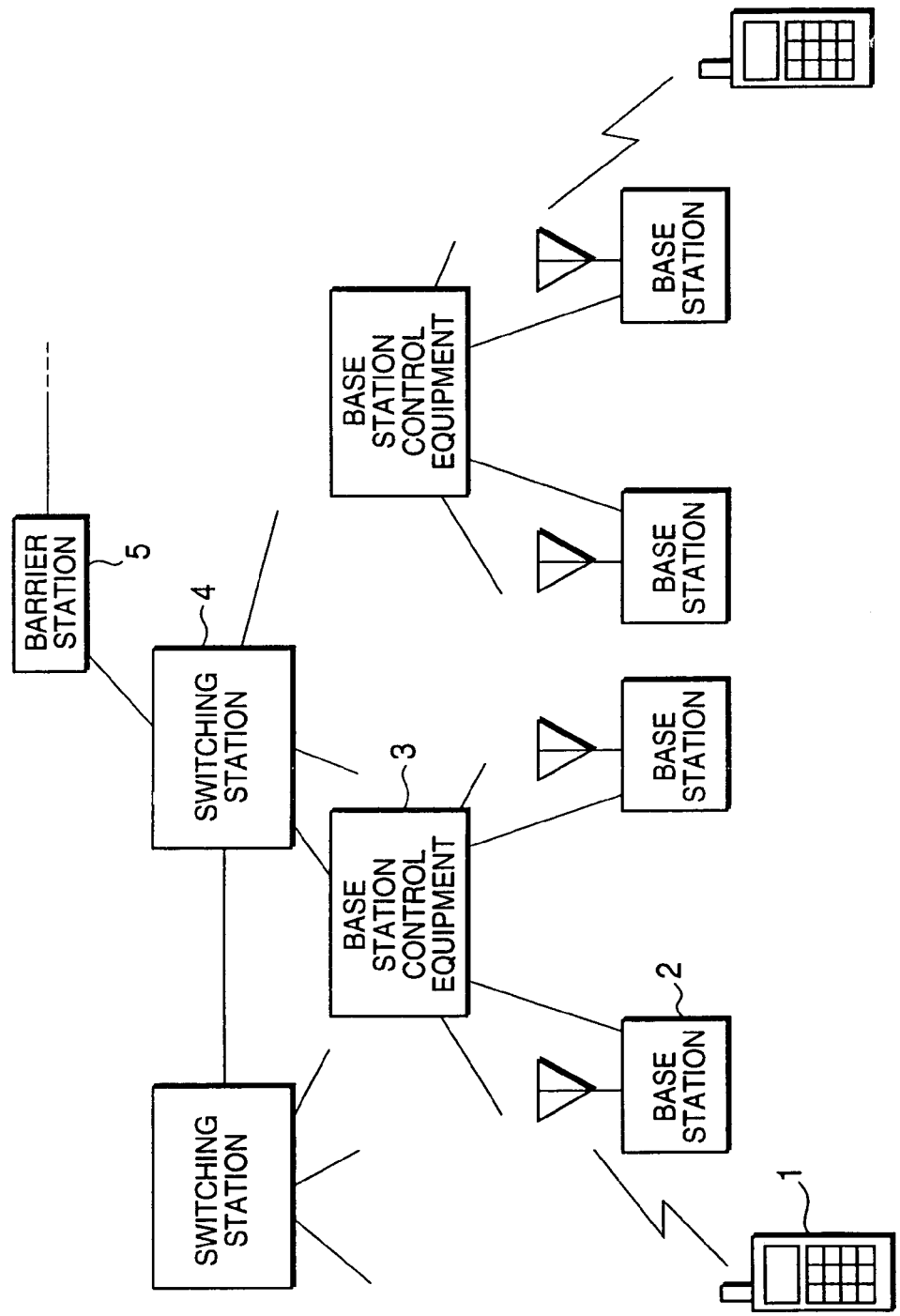
FIG. 2 is a block diagram showing a schematic arrangement of a CDMA mobile communication system to which a mobile station according to the present invention is applied.

FIG. 2 is a block diagram schematically showing an example of a CDMA mobile communication system to which a mobile station according to the present invention is applied.

ATM (Asynchronous Transfer Mode) communication techniques and the like have been applied to base stations, base station control equipment, and switching stations constituting the network side of a mobile communication system in consideration of the diversification (trends toward multimedia) of services provided by the mobile communication system and the efficient use (statistical multiplexing) of transmission paths that connect the respective base stations, base station equipment, and switching stations.

A mobile station 1 communicates with another mobile station, a terminal apparatus connected to another network, or the like through the mobile communication system. The mobile station 1 can perform various types of communications, e.g., speech communication and data communication.

Transmission data from the mobile station 1 is transmitted as communication data to a base station 2 by radio communication. The base station 2 performs various processes for the communication data received from the mobile station 1 or other mobile stations, e.g., assembling the data into ATM cells, and transmits the resultant data to base station equipment 3.

In this manner, base stations transmit information in the form of ATM cells within the network regardless of whether the communication data in a radio zone is speech data, image data, or data in other forms. This makes it possible to easily cope with multimedia communication forms.

The base station control equipment 3 routes the ATM cells received from the base station 2 in units of users, and transmits them to switching stations 4 or other subordinate base stations. The switching station 4 routes the ATM cells received from the base station control equipment 3 in units of users, and transmits them to other switching stations or a barrier station 5.

In such ATM cell transmission, ATM cells may be made to flow in a transmission path upon generation of the ATM cells. This obviates the necessity to prepare a transmission path for each predetermined channel in a conventional system. Therefore, a statistical multiplexing effect can be obtained, and transmission paths can be efficiently used. Note that the barrier station 5 is used to relay data to another network.

In transmitting data from the network side to the mobile station 1, the base station 2 performs primary modulation such as QPSK, then performs spread spectrum modulation as secondary modulation, and transmits the resultant data. A demodulation circuit of this embodiment can be applied to, for example, the mobile station 1. The mobile station 1 uses this demodulation circuit to demodulate a reception signal from the base station 2 by despreading it, thereby regenerating the data from the network side.

Figure 3:
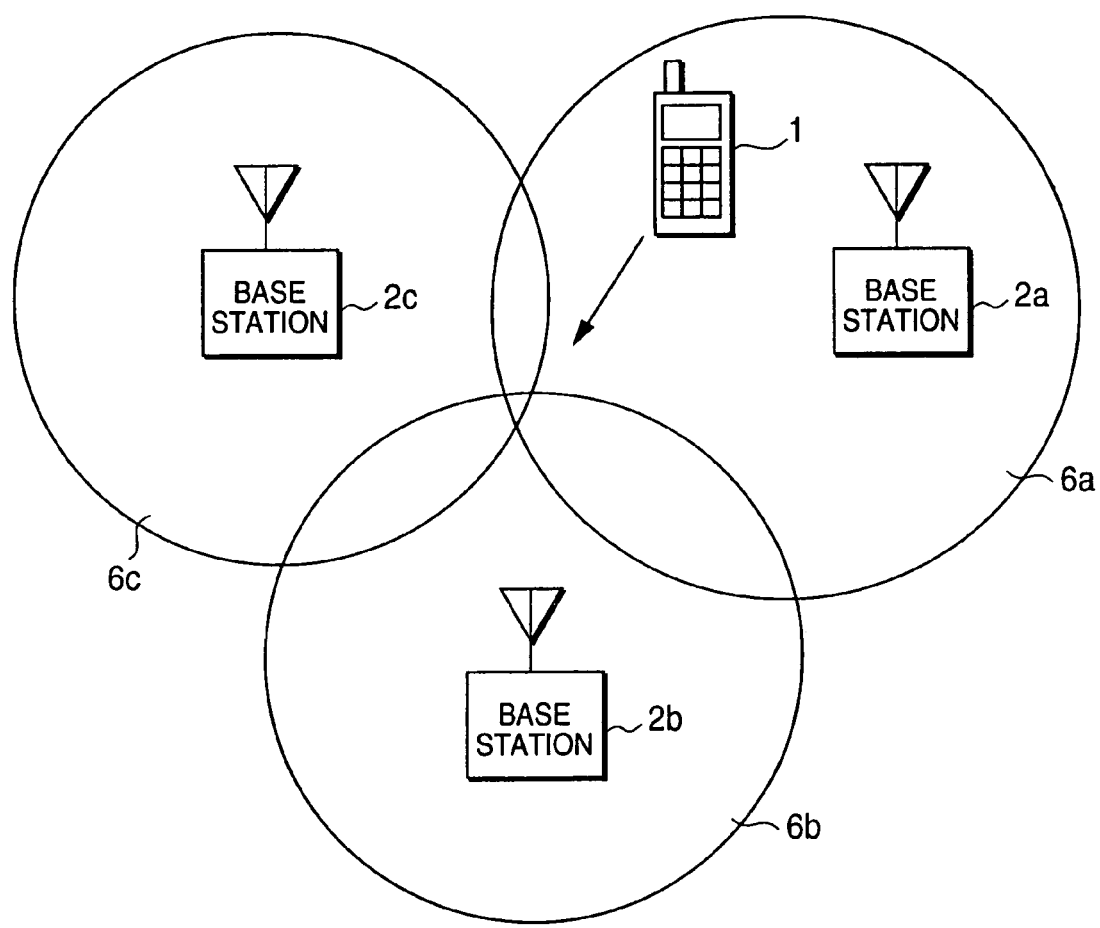
FIG. 3 is a block diagram showing a communication environment for the CDMA mobile communication system in FIG. 2.

FIG. 3 is a block diagram showing a communication environment for the CDMA mobile communication system to which the mobile station 1 shown in FIG. 2 is applied.

The CDMA mobile communication system shown in FIG. 3 uses the cellular scheme. In this system, the range covered by a base station 2a is a cell 6a, the range covered by a base station 2b is a cell 6b, and the range covered by a base station 2c is a cell 6c.

Assume that the mobile station 1 currently exists in the cell 6a and is moving in the direction indicated by the arrow in FIG. 3. At this time, the mobile station 1 communicates with only the base station 2a at first, and then performs handover upon detection of a decrease in the strength of a signal from the base station 2a. In this handover, the mobile station 1 simultaneously receives signals from base stations other than the base station 2a as well as the signal from the base station 2a, and finds out a base station from which the strongest signal can be received, thereby switching to the base station for the subsequent communication.

As described above, the mobile station 1 must simultaneously receive signals from a plurality of base stations in handover operation. The signals from the respective base stations are transmitted after being spread by different spreading codes. In order to allow the mobile station 1 to simultaneously receive the signals from the base stations, therefore, circuits for finding out the timings of despreading the reception signals must be prepared by the number of base stations from which signals are to be simultaneously received.

Figure 4:
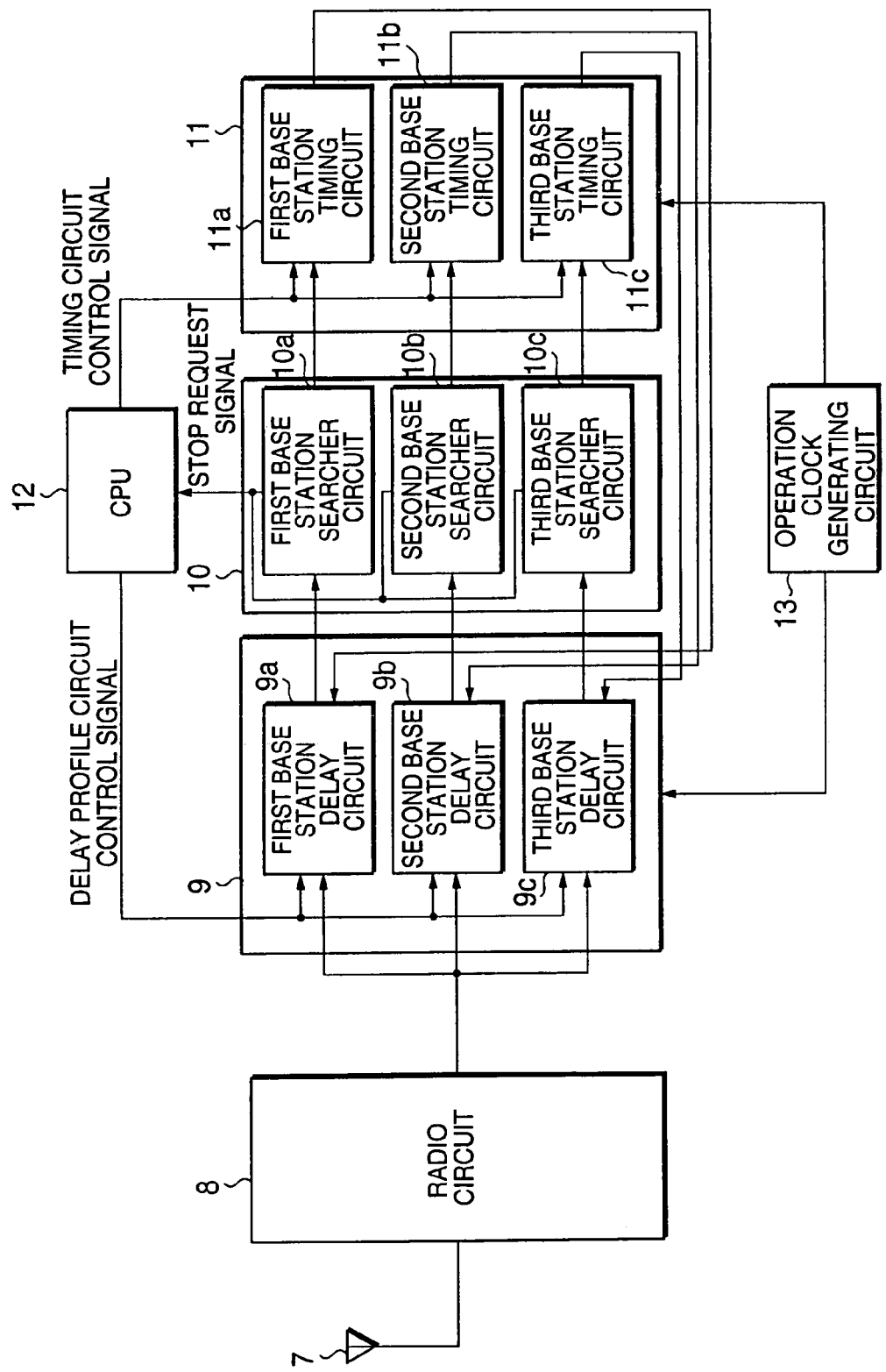
FIG. 4 is a block diagram showing the arrangement of mobile station according to the first embodiment of the present invention.

FIG. 4 is a block diagram showing a mobile station according to the first embodiment of the present invention.

This embodiment includes an antenna 7 for receiving signals from base stations, a radio circuit 8 for performing quadrature detection and modulation with respect to the signals received through the antenna 7, a delay profile circuit 9 for obtaining delay profiles by calculating the correlations between the signals from the radio circuit 8 and known data, a searcher circuit 10 for selecting one of the plurality of delay profiles obtained by the delay profile circuit 9 which exhibits a high correlation value and outputting a signal on which a despreading timing is based, a timing circuit 11 for outputting a pulse signal representing the correlation timing in the delay profile circuit 9 on the basis of the signal from the searcher circuit 10, a CPU 12 for controlling the operations of the delay profile circuit 9 and timing circuit 11, and an operation clock generating circuit 13 for generating and outputting operation clocks for operating the delay profile circuit 9 and timing circuit 11. The operation clock generating circuit 13 generates and outputs, for example, a clock signal having a frequency of 16.384 MHz.

As described above, a mobile station must simultaneously receive signals from a plurality of base stations in handover operation. In the case shown in FIG. 4, therefore, the delay profile circuit 9, searcher circuit 10, and timing circuit 11 are prepared for each base station.

The delay profile circuit 9 is comprised of a first base station delay profile circuit 9a, second base station delay profile circuit 9b, and third base station delay profile circuit 9c which are prepared for the respective base stations from which signals are simultaneously received.

The searcher circuit 10 is comprised of a first base station searcher circuit 10a, second base station searcher circuit 10b, and third base station searcher circuit 10c which are prepared for the respective base stations from which signals are simultaneously received.

The timing circuit 11 is comprised of a first base station timing circuit 11a, second base station timing circuit 11b, and third base station timing circuit 11c which are prepared for the respective base stations from which signals are simultaneously received.

Note that the searcher circuit 10 may be formed by a DSP, and its processing may be implemented by software. In this case, one DSP can perform processing associated with a plurality of base stations.

Figure 5:
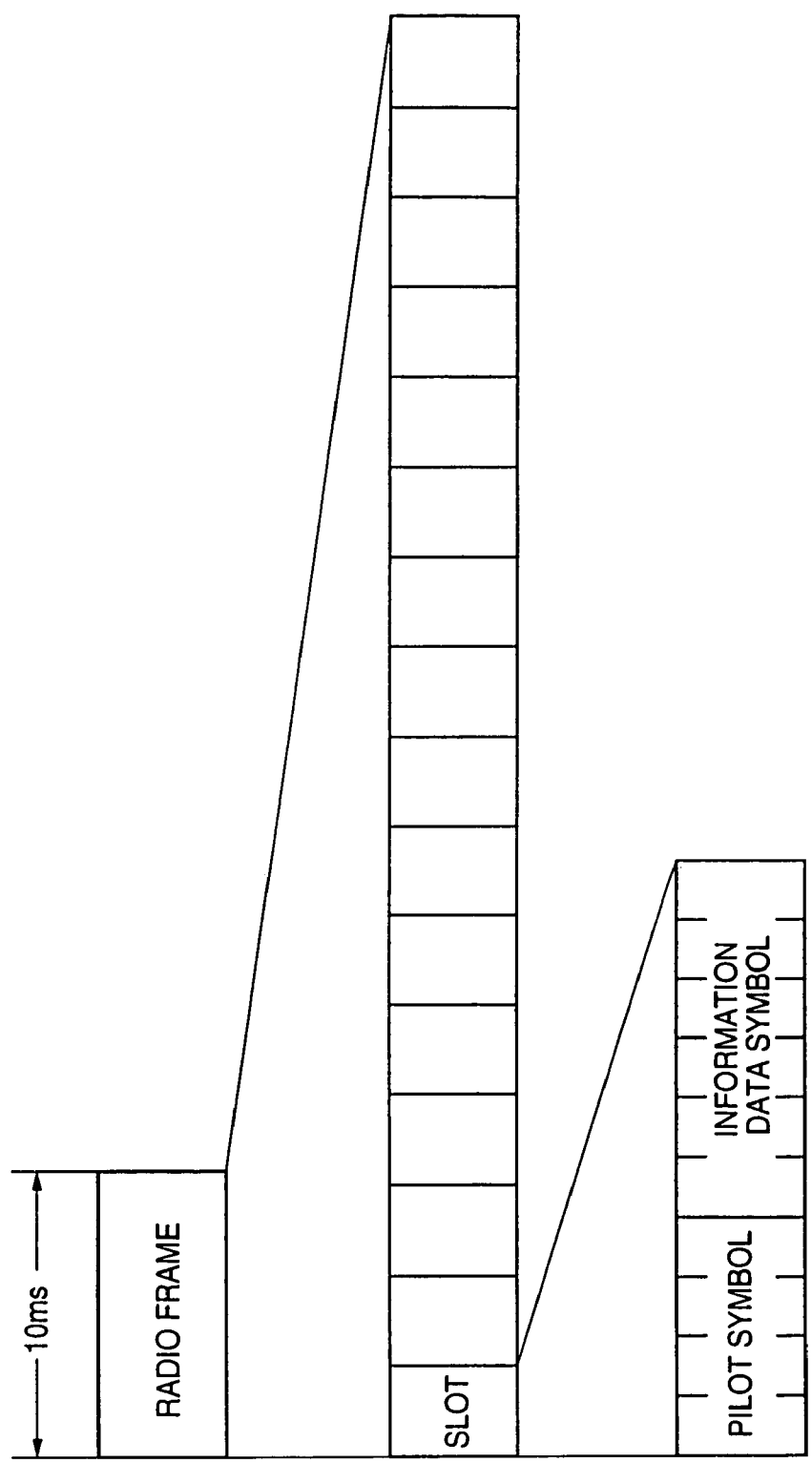
FIG. 5 is a view showing the signal format of an example of a reception signal transmitted from a base station and received by the mobile station in FIG. 2.

FIG. 5 is a view showing an example of the format of a reception signal which is transmitted from the base station 2 in FIG. 2 and received by the mobile station 1.

As shown in FIG. 5, a 10-ms long radio frames are continuously transmitted from the base station 2. One radio frame is constituted by 16 slots. One slot is constituted by 10 symbols. 10 symbols constituting one slot include four pilot symbols and six information data symbols.

A pilot symbol is known data predetermined by the communication system. The delay profile circuit 9 shown in FIG. 4 calculates a delay profile by using this known data. An information data symbol is actual data to be actually transmitted/received in communication between terminals.

As described above, the delay profile circuit 9 is configured for each base station and divided into the first base station delay profile circuit 9a, second base station delay profile circuit 9b, and third base station delay profile circuit 9c. Data transmitted from the respective base stations are spread by different spreading codes. The respective base station delay profile circuits 9a, 9b, and 9c despread the signals by despreading codes allocated to the respective base stations, thereby obtaining only the signals from the respective base stations.

Since the first base station delay profile circuit 9a, second base station delay profile circuit 9b, and third base station delay profile circuit 9c in the delay profile circuit 9 shown in FIG. 4 have the same internal arrangement, the first base station delay profile circuit 9a will be described below as a representative.

Likewise, since the first base station searcher circuit 10a, second base station searcher circuit 10b, and third base station searcher circuit 10c in the searcher circuit 10 shown in FIG. 4 have the same internal arrangement, the first base station searcher circuit 10a will be described below as a representative. Since the first base station timing circuit 11a, second base station timing circuit 11b, and third base station timing circuit 11c in the timing circuit 11 shown in FIG. 4 have the same internal arrangement, the first base station timing circuit 11a will be described below as a representative.

Figure 6:
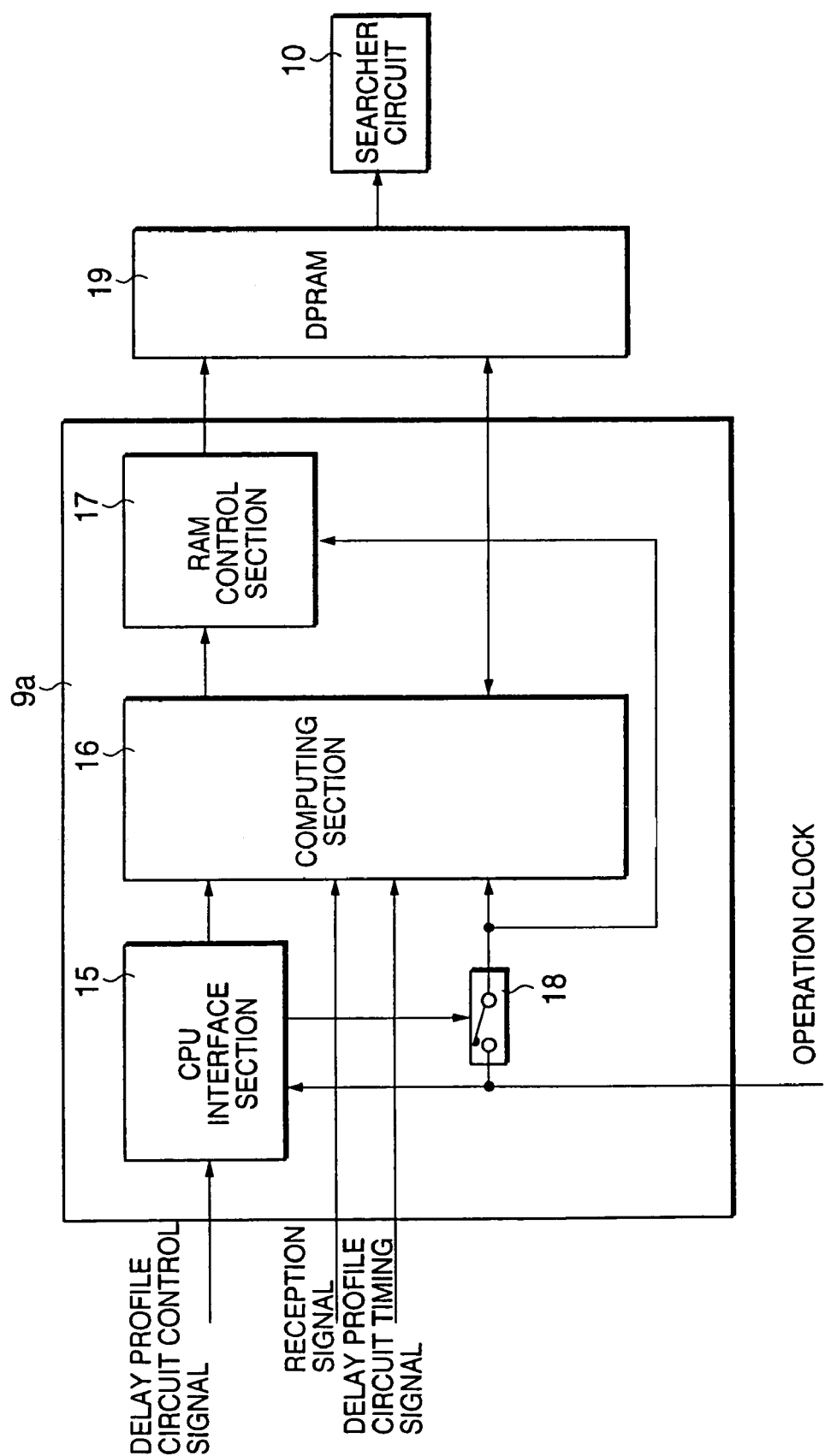
FIG. 6 is a block diagram showing the internal arrangement of a first base station delay profile circuit in FIG. 4.

FIG. 6 is a block diagram showing the internal arrangement of the first base station delay profile circuit 9a in FIG. 4.

The first base station delay profile circuit 9a includes a CPU interface section 15 serving as an interface for receiving a delay profile circuit control signal from the CPU 12 in FIG. 4, a computing section 16 for performing a computation for obtaining a delay profile, a RAM control circuit 17 for controlling read/write with respect to an external DPRAM 19, and a switch section 18 for performing switching operation to supply operation clocks or stop supplying them. The CPU interface section 15, computing section 16, and RAM control circuit 17 operate upon receiving operation clocks. The computing section 16 and RAM control circuit 17 stop operating when the supply of operation clocks is stopped. During this operation stop period, they consume almost no power. The switch section 18 is normally closed to supply operation clocks to the computing section 16 and RAM control circuit 17 as well as the CPU interface section 15.

The DPRAM 19 is a bidirectional RAM, which allows read/write operation in two directions, i.e., from the delay profile circuit 9 side and the searcher circuit 10 side. The delay profile circuit 9 and searcher circuit 10 exchange data through the DPRAM 19. More specifically, the delay profiles generated by the delay profile circuit 9 are written in the DPRAM 19, and the searcher circuit 10 reads out the delay profiles from the DPRAM 19.

A total of three DPRAMs, each identical to the DPRAM 19, may be prepared for the first base station delay profile circuit 9a, second base station delay profile circuit 9b, and third base station delay profile circuit 9c, or only one DPRAM may be prepared for the delay profile circuit 9.

Figure 7:
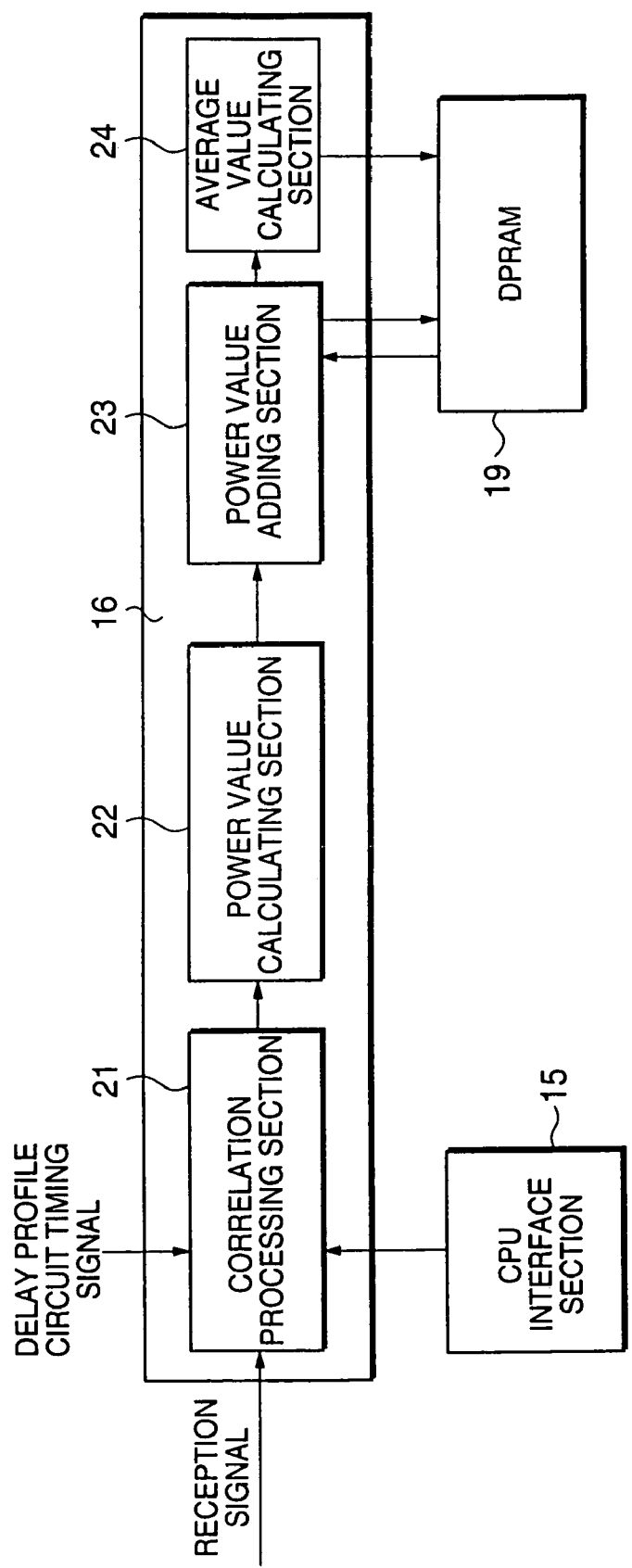
FIG. 7 is a block diagram showing the internal arrangement of a computing section in the first base station delay profile circuit in FIG. 6.

FIG. 7 is a block diagram showing the internal arrangement of the computing section 16 in the first base station delay profile circuit 9a in FIG. 6.

The computing section 16 is comprised of a correlation processing section 21 for calculating the correlations between a reception signal from the first base station and known data, a power value calculating section 22 for converting the correlation results obtained by the correlation processing section 21 into power values, a power value adding section 23 for adding the outputs from the power value calculating section 22, and an average value calculating section 24 for obtaining the average of addition results corresponding to a plurality of slots of the reception signal and outputting the average as a delay profile.

Referring to FIG. 6, the computing section 16 performs control such as addressing for write/read operation with respect to the DPRAM 19 through the RAM control circuit 17. FIG. 7 shows the flow of data, and hence does not show the RAM control circuit 17.

The operation of the first base station delay profile circuit 9a will be described below with reference to FIGS. 6 and 7.

Figure 10:
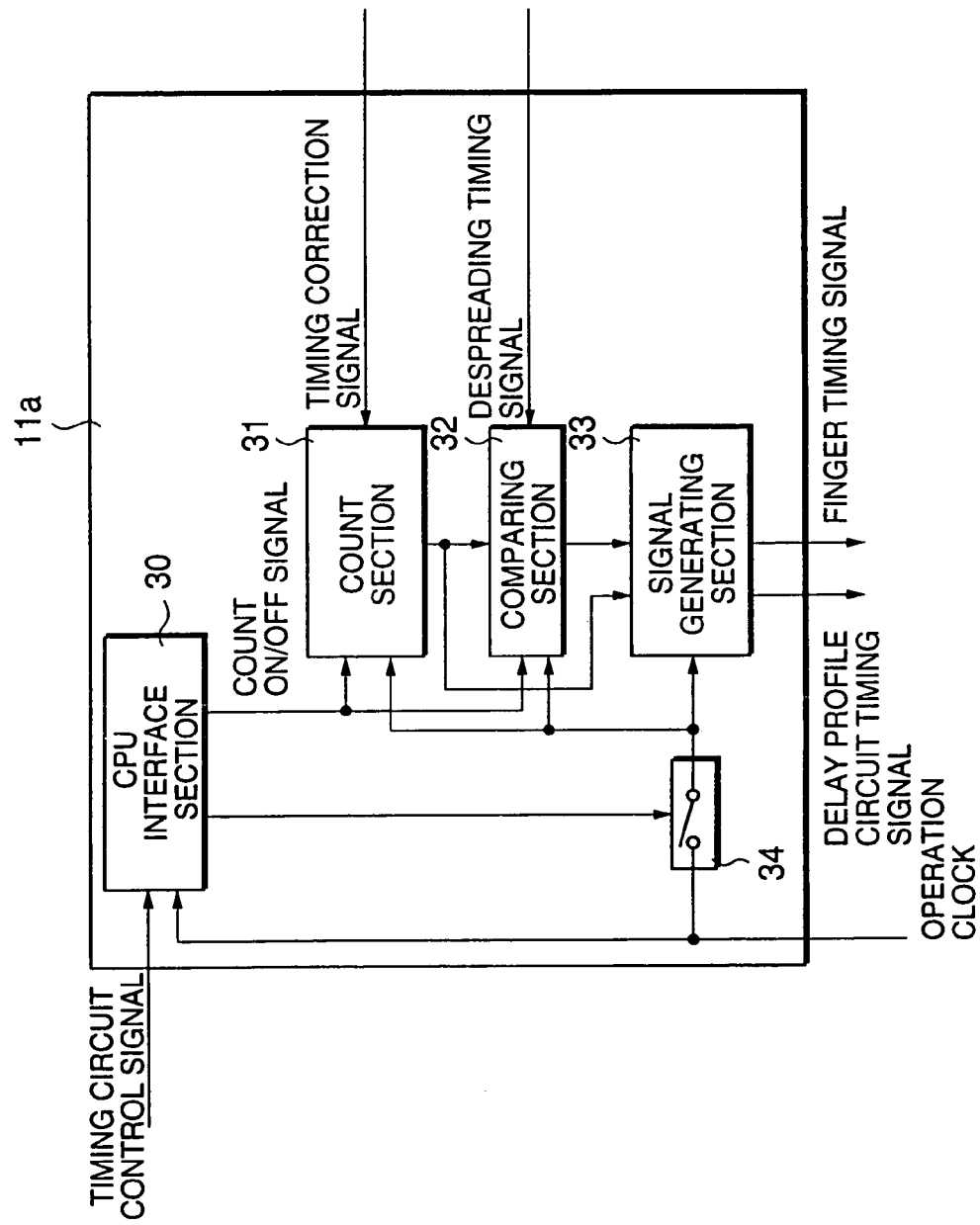
FIG. 10 is a block diagram showing the internal arrangement of a first base station timing circuit in FIG. 4.

A reception signal from the radio circuit 8 in FIG. 4 and a delay profile circuit timing signal from the first base station timing circuit 11a in FIG. 10 are input to the computing section 16 of the first base station delay profile circuit 9a in FIG. 6.

The correlation processing section 21 of the computing section 16 in FIG. 7 receives a spreading code for the corresponding base station and known data (e.g., a pilot symbol) from the CPU 12 through the CPU interface section 15, and despreads the reception signal by using the spreading code. The correlation processing section 21 also obtains the correlations between the reception signal and the known data upon despreading the reception signal at the timing indicated by the delay profile circuit timing signal.

Figure 8:
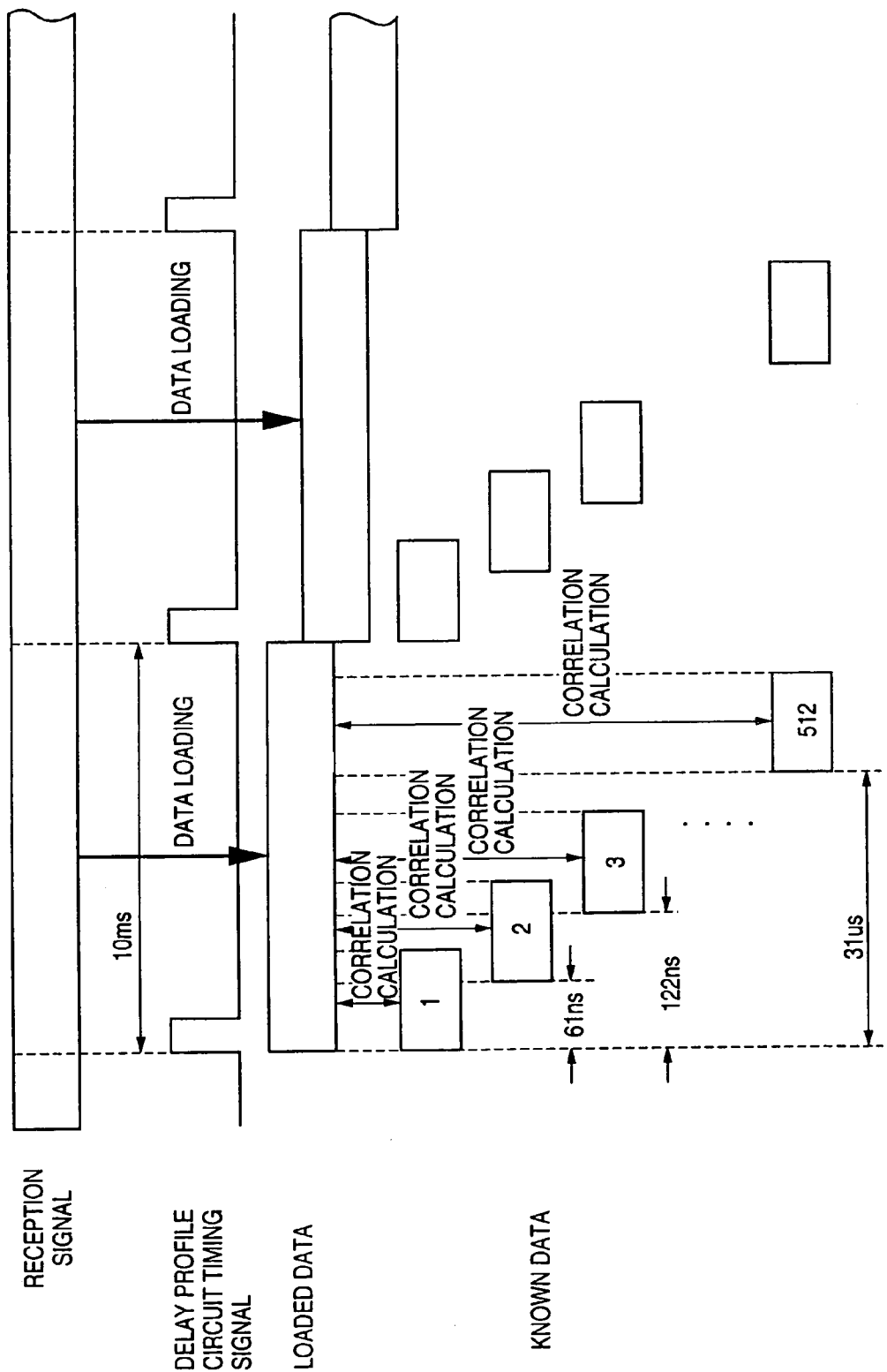
FIG. 8 is a view for explaining the processing of obtaining correlations in a correlation processing section in FIG. 7.

FIG. 8 is a view for explaining the processing for obtaining correlations in the correlation processing section 21 in FIG. 7.

First of all, the correlation processing section 21 despreads the reception signal by using the despreading code obtained through the CPU interface section 15. The reception signal shown in FIG. 8 is a signal obtained by despreading.

As shown in FIG. 8, the correlation processing section 21 then loads the reception signal at the timing indicated by the delay profile circuit timing signal, and obtains the correlations between the loaded data and the known data.

In obtaining the correlations, the correlation processing section 21 obtains a plurality of correlation results while shifting gradually shifting the position of the known data relative to the loaded data (shifting the correlation detection timing). In the case shown in FIG. 8, a total of 512 correlation results are obtained by shifting the relative position 61 ns at a time. This correlation detection timing shift width, 61 ns, is the pulse period of a 16.384-MHz clock generated by the operation clock generating circuit 13 in FIG. 4. As is obvious, however, the present invention is not limited to this.

The correlation results obtained in this manner are transferred to the power value calculating section 22 and subsequent blocks. Subsequently, the power value calculating section 22 converts the correlation results obtained by the correlation processing section 21 into power values. The power value adding section 23 adds the outputs from the power value calculating section 22. The average value calculating section 24 obtains the average of addition results corresponding to a plurality of slots of the reception signal and outputting the average as a delay profile.

The power value adding section 23 uses the DPRAM 19 to temporarily store the data obtained by addition processing. The average value calculating section 24 writes the obtained delay profiles in the DPRAM 19 to output the delay profile. As a consequence, 512 delay profiles with different correlation detection timings are written in the DPRAM 19. The searcher circuit 10 in FIG. 4 obtains the delay profiles as correlation results through the DPRAM 19.

Figure 9:
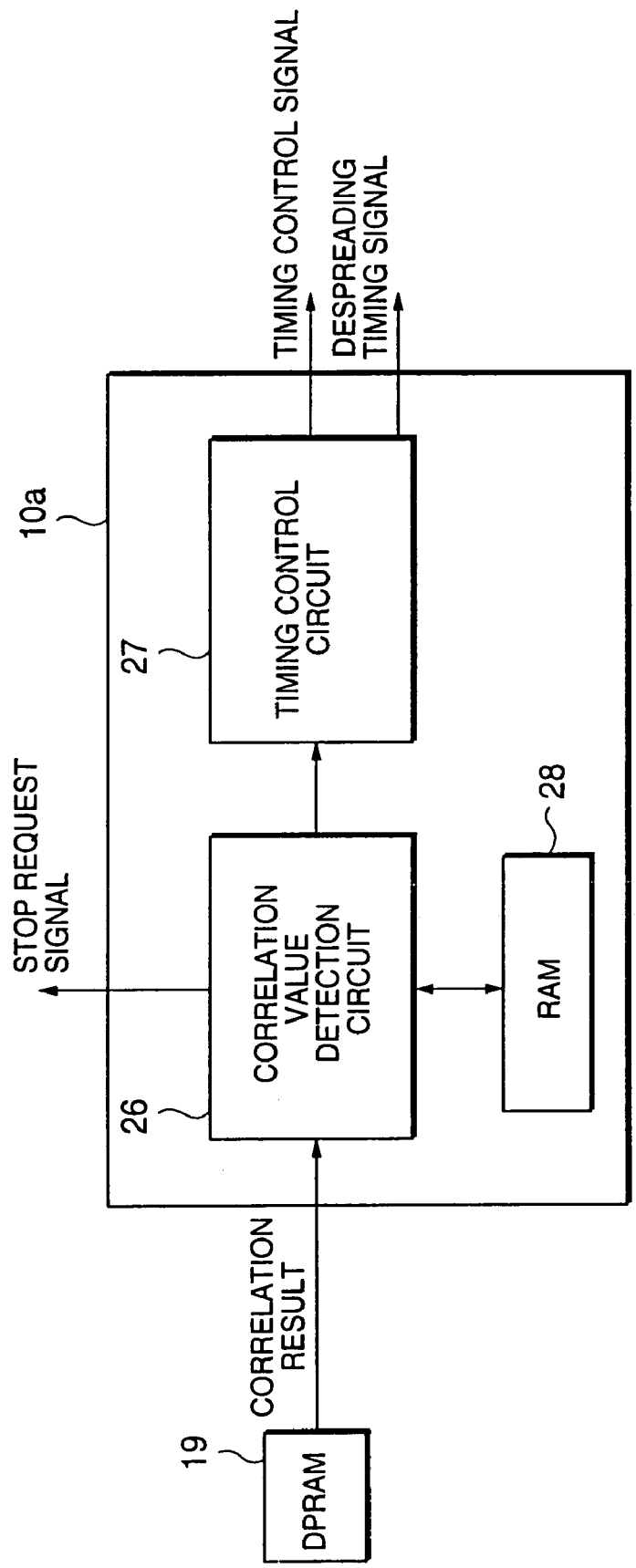
FIG. 9 is a block diagram showing the internal arrangement of a first base station searcher circuit in FIG. 4.

FIG. 9 is a block diagram showing the internal arrangement of the first base station searcher circuit 10a shown in FIG. 4.

The first base station searcher circuit 10a is comprised of a correlation value detection circuit 26 for finding out a delay profile exhibiting the largest correlation value from a plurality of delay profiles with different correlation detection timings which are obtained by the first base station delay profile circuit 9a, and outputting a stop request signal by performing processing (to be described later) with respect to the correlation value, a timing control circuit 27 for outputting a timing correction signal for correcting the correlation detection timing in the first base station delay profile circuit 9a on the basis of the correlation detection timing of the delay profile exhibiting the largest correlation value which is found out by the correlation value detection circuit 26, and also outputting a despreading timing signal representing the timing of despreading the reception signal, and a RAM 28 in which a threshold used for the processing of outputting a stop request signal in the correlation value detection circuit 26 is stored.

In the first base station searcher circuit 10a shown in FIG. 9, first of all, the correlation value detection circuit 26 reads out 512 delay profiles with different correlation detection timings from the DPRAM 19, searches out a delay profile exhibiting the largest correlation value, i.e., the peak correction value, and notifies the timing control circuit 27 of it.

The processing of outputting a stop request signal in the correlation value detection circuit 26 will be described later.

The timing control circuit 27 outputs a timing correction signal for correcting the correlation detection timing in the first base station delay profile circuit 9a on the basis of the correlation detection timing of the delay profile exhibiting the largest correlation value which is found out by the correlation value detection circuit 26, and outputs a despreading timing signal representing the timing of despreading the reception signal in a finger (not shown).

The timing correction signal and despreading timing signal output from the timing control circuit 27 in the first base station searcher circuit 10a will be described below.

As shown in FIG. 8, each of the base station delay profile circuits 9a, 9b, and 9c in the delay profile circuit 9 obtains 512 delay profiles with different correlation detection timings. If, therefore, known data inserted in a reception signal is located outside the 512 delay profiles, a correct despreading position cannot be found out.

In order to solve this problem, the timing control circuit 27 outputs a timing correction signal for correcting a delay profile circuit timing signal such that an almost middle delay profile of the 512 delay profiles in FIG. 8 exhibits the largest correlation value.

The despreading timing signal output from the timing control circuit 27 is used to notify a finger (not shown) of the timing of despreading the reception signal. Therefore, with a data format in which known data, i.e., pilot symbols, are located in the head portion of each slot as shown in FIG. 5, a despreading timing signal is output at the correlation detection timing of one of the 512 delay profiles in FIG. 8 which exhibits the largest correlation value.

The timing correction signal and despreading timing signal output from the timing control circuit 27 in the first base station searcher circuit 10a are input to the first base station timing circuit 11a in FIG. 10.

FIG. 10 is a block diagram showing the internal arrangement of the first base station timing circuit 11a in FIG. 4.

The first base station timing circuit 11a is comprised of a CPU interface section 30 serving as an interface for receiving a timing circuit control signal from the CPU 12 in FIG. 4, a count section 31 for counting up on the basis of a counter on/off signal from the CPU interface section 30 and a timing correction signal from the first base station searcher circuit 10a, and outputting timing data having a period of 10 ms, a comparing section 32 for comparing the timing data output form the count section 31 with the despreading timing signal from the first base station searcher circuit 10a and outputting timing data indicating the coincidence therebetween, a signal generating section 33 for generating a pulse signal on the basis of the timing data output from the count section 31 to output it as a delay profile circuit timing signal, and generating a pulse signal on the basis of the timing data output from the comparing section 32 to output it as a finger timing signal, and a switch section 34 for performing switching operation to supply operation clocks or stop supplying them. The CPU interface section 30, count section 31, comparing section 32, and signal generating section 33 operate upon receiving operation clocks. The count section 31, comparing section 32, and signal generating section 33 stop operating when the supply of operation clocks is stopped. During this operation stop period, they consume almost no power. The switch section 34 is normally closed to supply operation clocks to the count section 31, comparing section 32, and signal generating section 33 as well as the CPU interface section 30.

In the first base station timing circuit 11a, the count section 31 counts a period of 10 ms and outputs it by counting up in accordance with a counter on/off signal obtained through the CPU interface section 30, thereby generating a signal having a period corresponding to the length of the radio frame shown in FIG. 5.

The count section 31 is reset by a timing correction signal from the timing control circuit 27 in FIG. 9. As a result, a signal having a period corresponding to the length of the radio frame is generated at the timing of the timing correction signal.

The signal from the count section 31 is input to the signal generating section 33. The signal generating section 33 generates a pulse signal at the period of the signal from the count section 31, and outputs it as a delay profile circuit timing signal.

The signal from the count section 31 is also input to the comparing section 32. The comparing section 32 compares the signal input from the count section 31 with the despreading timing signal from the timing control circuit 27 in FIG. 9, and outputs a coincidence signal when they coincide with each other. This coincidence signal is input to the signal generating section 33. The signal generating section 33 generates a pulse signal at the period of the coincidence signal from the comparing section 32, and outputs it as a finger timing signal. This finger timing signal is input to the finger (not shown) to be used as a despreading timing in the finger.

Figure 11:
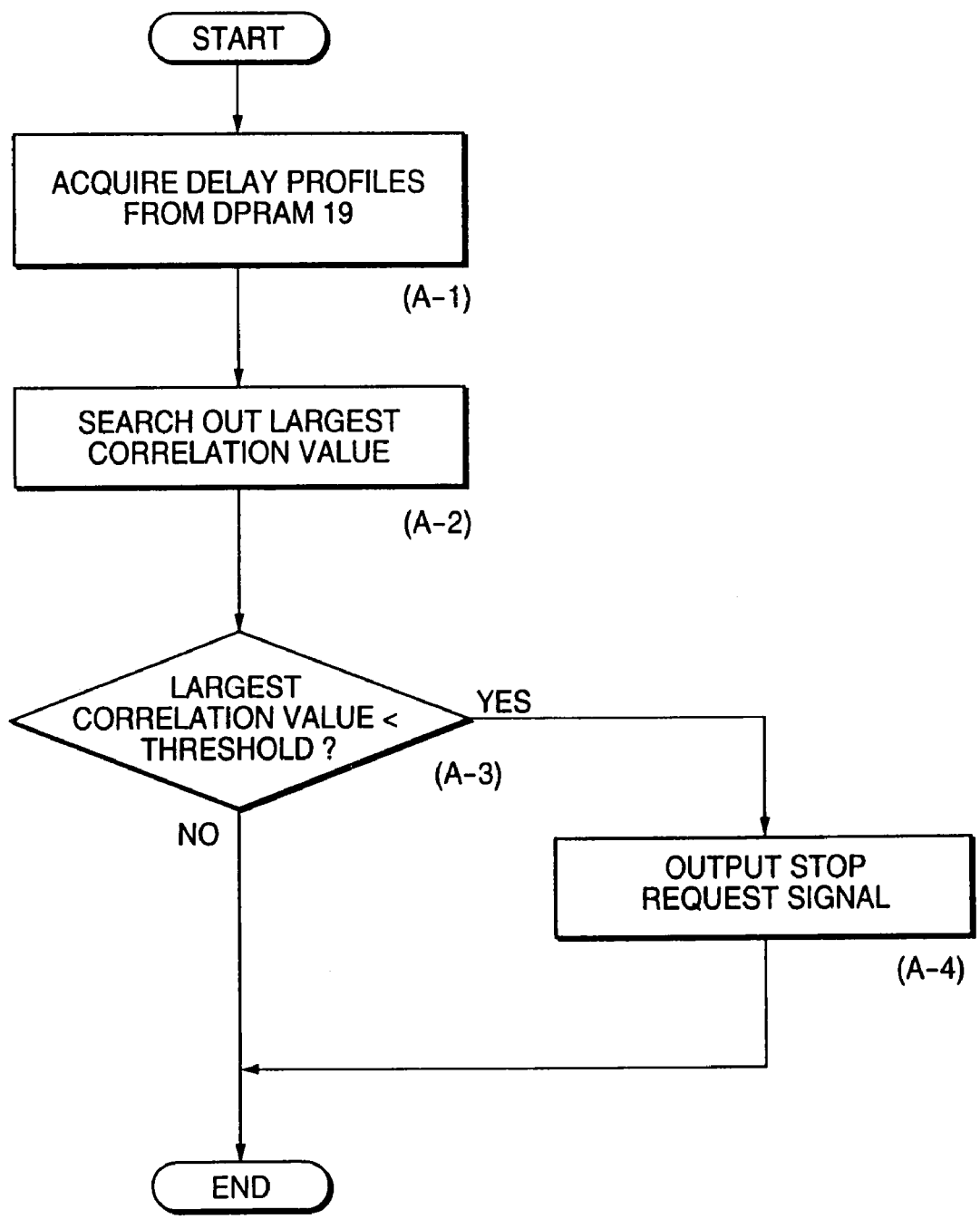
FIG. 11 is a flow chart showing the processing of outputting a stop request signal from a correlation value detection circuit in FIG. 9.

FIG. 11 is a flow chart showing the processing of outputting a stop request signal from the correlation value detection circuit 26 in FIG. 9 in the first embodiment of the present invention.

First of all, the correlation value detection circuit 26 in FIG. 9 reads out 512 delay profiles with different correlation detection timings from the DPRAM 19 (step A-1), and searches the delay profiles for a delay profile exhibiting the largest correlation value, i.e., the peak correlation value (step A-2).

Figure 12:
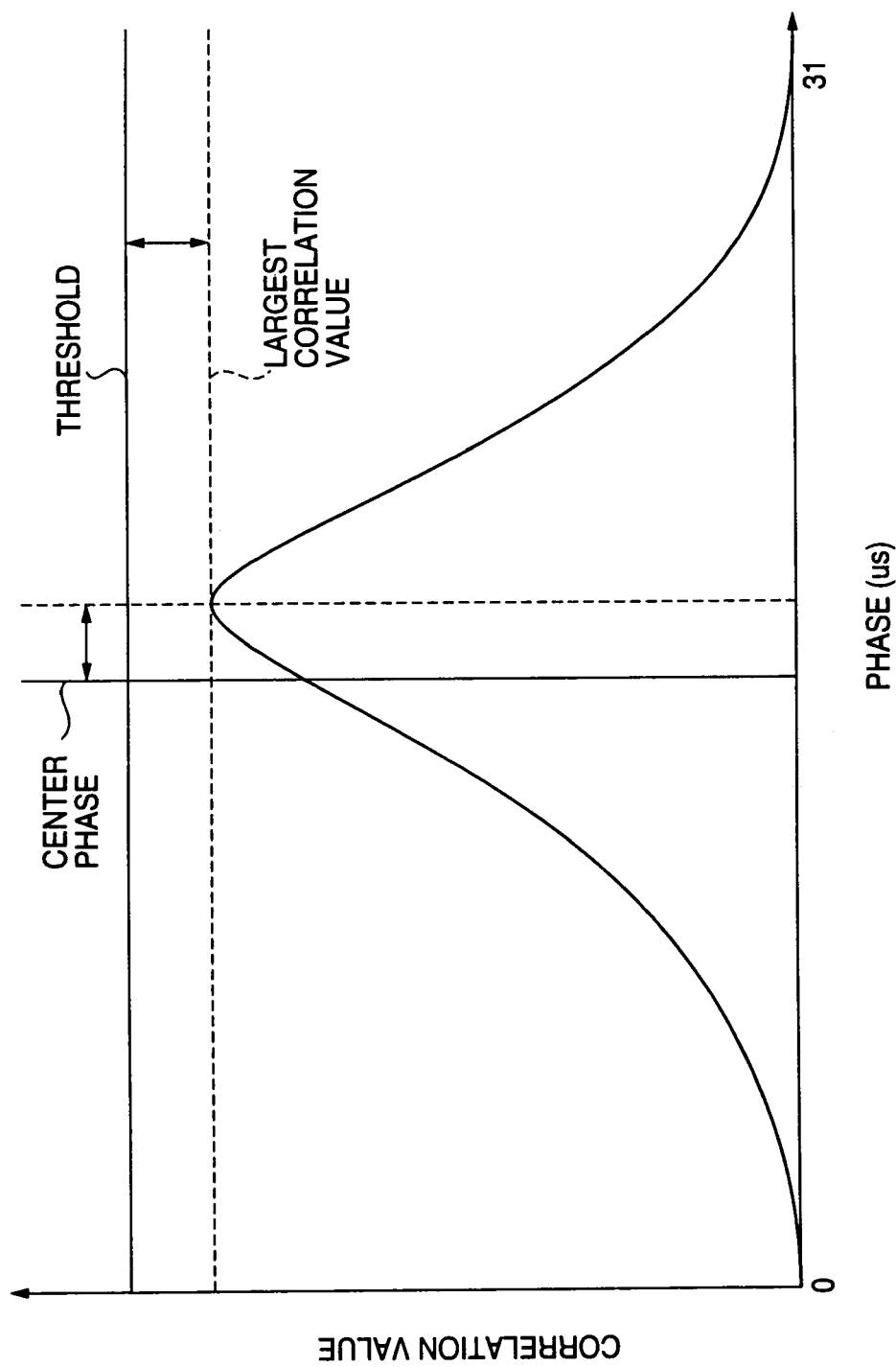
FIG. 12 is a graph for explaining the processing shown in FIG. 11.

The largest correlation value is compared with the threshold stored in advance in the RAM 28 in the first base station searcher circuit 10*a* (step A-3). If the largest value is smaller than the threshold, as shown in FIG. 12, a stop request signal is output (step A-4).

Upon receiving this stop request signal, the CPU 12 in FIG. 4 outputs the corresponding information over a delay profile circuit control signal. Upon receiving this delay profile circuit control signal, the CPU interface section 15 in the first base station delay profile circuit 9*a* in FIG. 6 opens the switch section 18 to stop the supply of operation clocks to the computing section 16 and RAM control circuit 17. The computing section 16 and RAM control circuit 17 stop operating when the supply of operation clocks is stopped. This makes it possible to reduce power consumption.

Upon receiving the stop request signal, the CPU 12 outputs the corresponding information over a timing circuit control signal. Upon receiving this timing circuit control signal, the CPU interface section 30 in the first base station timing circuit 11*a* in FIG. 10 opens the switch section 34 to stop the supply of operation clocks to the count section 31, comparing section 32, and signal generating section 33. The count section 31, comparing section 32, and signal generating section 33 stop operating when the supply of operation clocks is stopped. This makes it possible to reduce power consumption.

Figure 13:
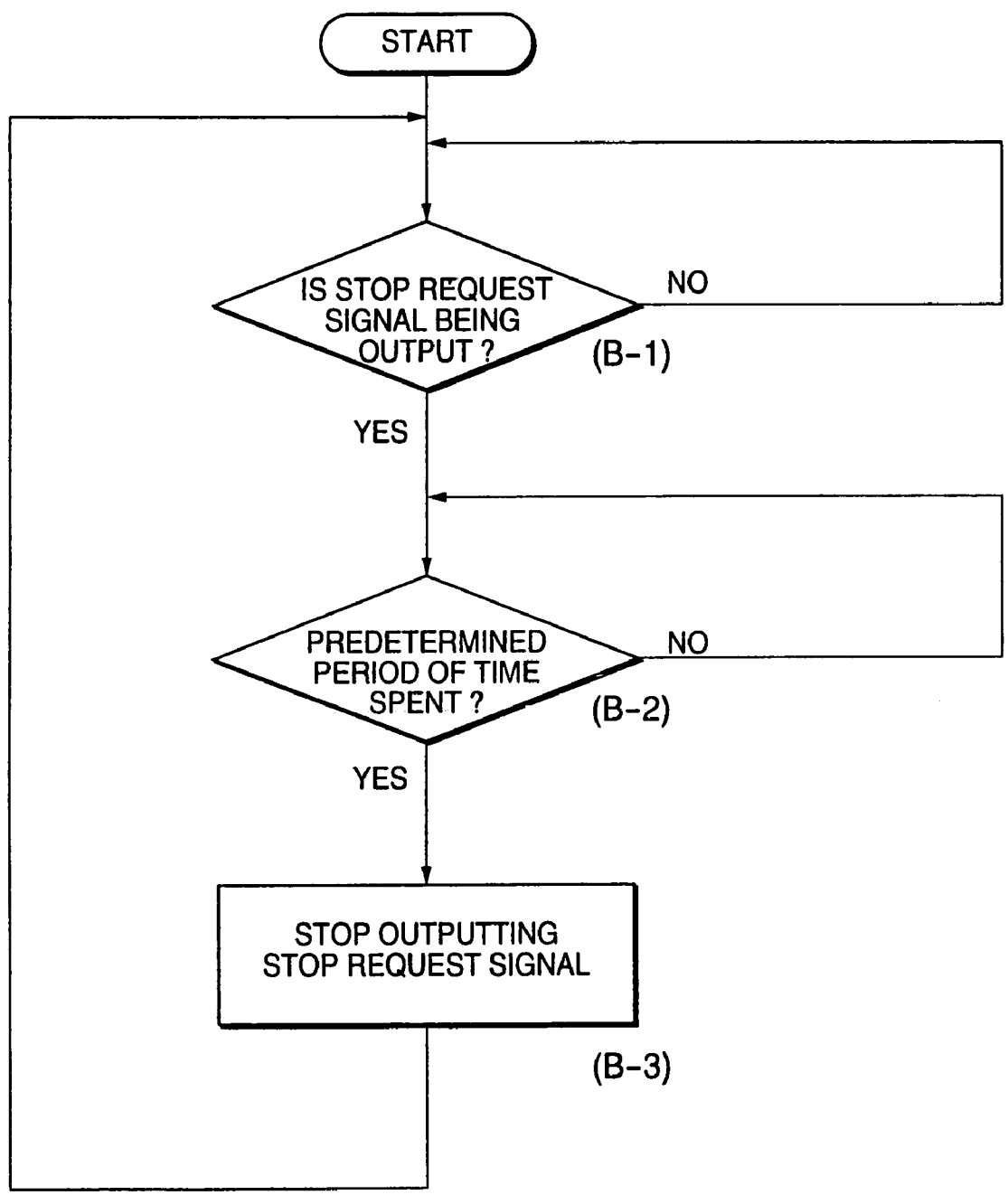
FIG. 13 is a flow chart associated with the processing of restoring operation when a stop request signal is output from the correlation value detection circuit in FIG. 9.

FIG. 13 is a flow chart showing the processing of restoring operation when a stop request signal is output from the correlation value detection circuit 26 in FIG. 9. The processing shown in FIG. 13 is executed by the correlation value detection circuit 26 in FIG. 9.

In step B-1, it is checked whether a stop request signal is currently output. If NO in step B-1, the flow waits until a stop request signal is output.

If YES in step B-1, the flow waits until a predetermined period of time elapses after the stop request signal is output (step B-2). When this predetermined period of time has elapsed, outputting the stop request signal is stopped (step B-3).

The predetermined period of time in step B-2 is preferably a natural number multiple of the length of a radio frame. If the length of the radio frame is 10 ms, the predetermined period of time is 10 ms×n (n is a natural number).

When outputting the stop request signal to the CPU 12 in FIG. 4 is stopped, the CPU 12 outputs the corresponding information over a delay profile circuit control signal. Upon receiving this delay profile circuit control signal, the CPU interface section 15 in the first base station delay profile circuit 9*a* in FIG. 6 closes the switch section 18 to resume supplying operation clocks to the computing section 16 and RAM control circuit 17.

In addition, when the stop request signal is stopped, the CPU 12 outputs the corresponding information over a timing circuit control signal. Upon receiving this timing circuit control signal, the CPU interface section 30 in the first base station timing circuit 11*a* in FIG. 10 closes the switch section 34 to resume supplying operation clocks to the count section 31, comparing section 32, and the signal generating section 33.

The second embodiment of the present invention will be described next. Since the second embodiment has the same block arrangement as that of the first embodiment, the second embodiment will be described with reference to FIGS. 2 to 8, and a detailed description thereof will be omitted. In this embodiment, a searcher circuit 10 in FIG. 4 is not configured to perform processing independently for each of a plurality of base stations from which signals are simultaneously received but is configured to refer to the correlation values of delay profiles associated with a plurality of base stations.

Figure 14:
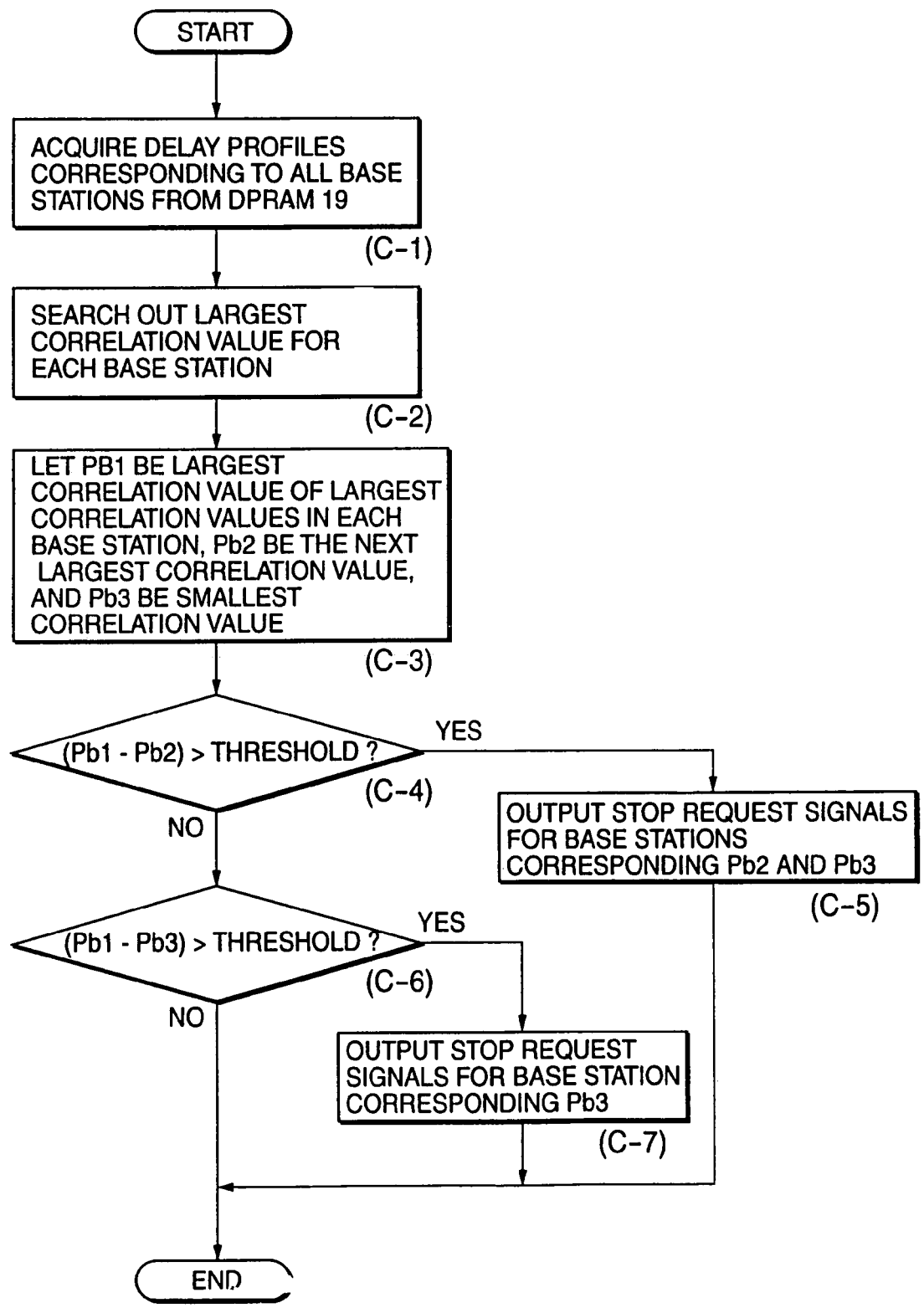
FIG. 14 is a flow chart associated with the processing of outputting a stop request signal from the correlation value detection circuit in FIG. 9 in the second embodiment of the present invention.

FIG. 14 is a flow chart showing the processing of outputting a stop request signal from a correlation value detection circuit 26 in FIG. 9 in the second embodiment of the present invention.

The correlation value detection circuit 26 in FIG. 9 reads out 512 delay profiles with different correlation detection timings, corresponding to each base station, from a DPRAM 19 (step C-1), and searches the delay profiles for a delay profile exhibiting the largest correlation value, i.e., the peak correlation value, for each base station (step C-2).

Of the largest correlation values obtained for the respective base stations, the largest value is represented by Pb1; the second largest value, Pb2, and the smallest value, Pb3 (step C-3). The difference (Pb1−Pb2) between Pb1 and Pb2 is then compared with a threshold stored in advance in the RAM 28 (step C-4). If (Pb1−Pb2) is larger than the threshold, stop request signals for the base stations corresponding to Pb2 and Pb3 are output (step C-5).

Upon receiving these stop request signals, a CPU 12 in FIG. 4 outputs the corresponding information over delay profile circuit control signals, and stops supplying operation clocks to computing sections 16 and RAM control circuits 17 for the base stations corresponding to Pb2 and Pb3 by the same processing as that in the first embodiment. The computing sections 16 and RAM control circuits 17, stop operating when the supply of operation clocks is stopped. This makes it possible to reduce power consumption.

In addition, upon receiving the stop request signals, the CPU 12 outputs the corresponding information over timing circuit control signals, and stops supplying operation clocks to count sections 31, comparing sections 32, and signal generating sections 33 for the base stations corresponding to Pb2 and Pb3 by the same processing as that in the first embodiment. The count sections 31, comparing sections 32, and signal generating sections 33 stop operating when the supply of operation clocks is stopped. This makes it possible to reduce power consumption.

If it is determined in step C-4 that (Pb1–Pb2) is equal to or smaller than the threshold, the difference (Pb1–Pb3) between Pb1 and Pb3 is compared with the threshold stored in advance in the RAM 28. If (Pb1–Pb3) is larger than the threshold, a stop request signal for the base station corresponding to Pb3 is output (step C-7).

Upon receiving this stop request signal, the CPU 12 in FIG. 4 outputs the corresponding information over delay profile circuit control signals, and stops supplying operation clocks to the computing section 16 and RAM control circuit 17 for the base station corresponding to Pb3 by the same processing as that in the first embodiment. The computing section 16 and RAM control circuit 17 stop operating when the supply of operation clocks is stopped. This makes it possible to reduce power consumption.

Upon receiving the stop request signal, the CPU 12 outputs the corresponding information over timing circuit control signals, and stops supplying operation clocks to the count section 31, comparing section 32, and signal generating section 33 for the base station corresponding to Pb3 by the same processing as that in the first embodiment. The count section 31, comparing section 32, and signal generating section 33 stop operating when the supply of operation clocks is stopped. This makes it possible to reduce power consumption.

Since the processing of restoring operation when a stop request signal is output from the correlation value detection circuit 26 in FIG. 9 in the second embodiment is the same as that shown in FIG. 13, a description thereof will be omitted.

The third embodiment of the present invention will be described next. Since the third embodiment has the same block arrangement as that of the first embodiment, the third embodiment will be described with reference to FIGS. 2 to 8, and a detailed description thereof will be omitted. In this embodiment, as in the second embodiment, a searcher circuit 10 in FIG. 4 is not configured to perform processing independently for each of a plurality of base stations from which signals are simultaneously received but is configured to refer to the correlation values of delay profiles associated with a plurality of base stations.

Figure 15:
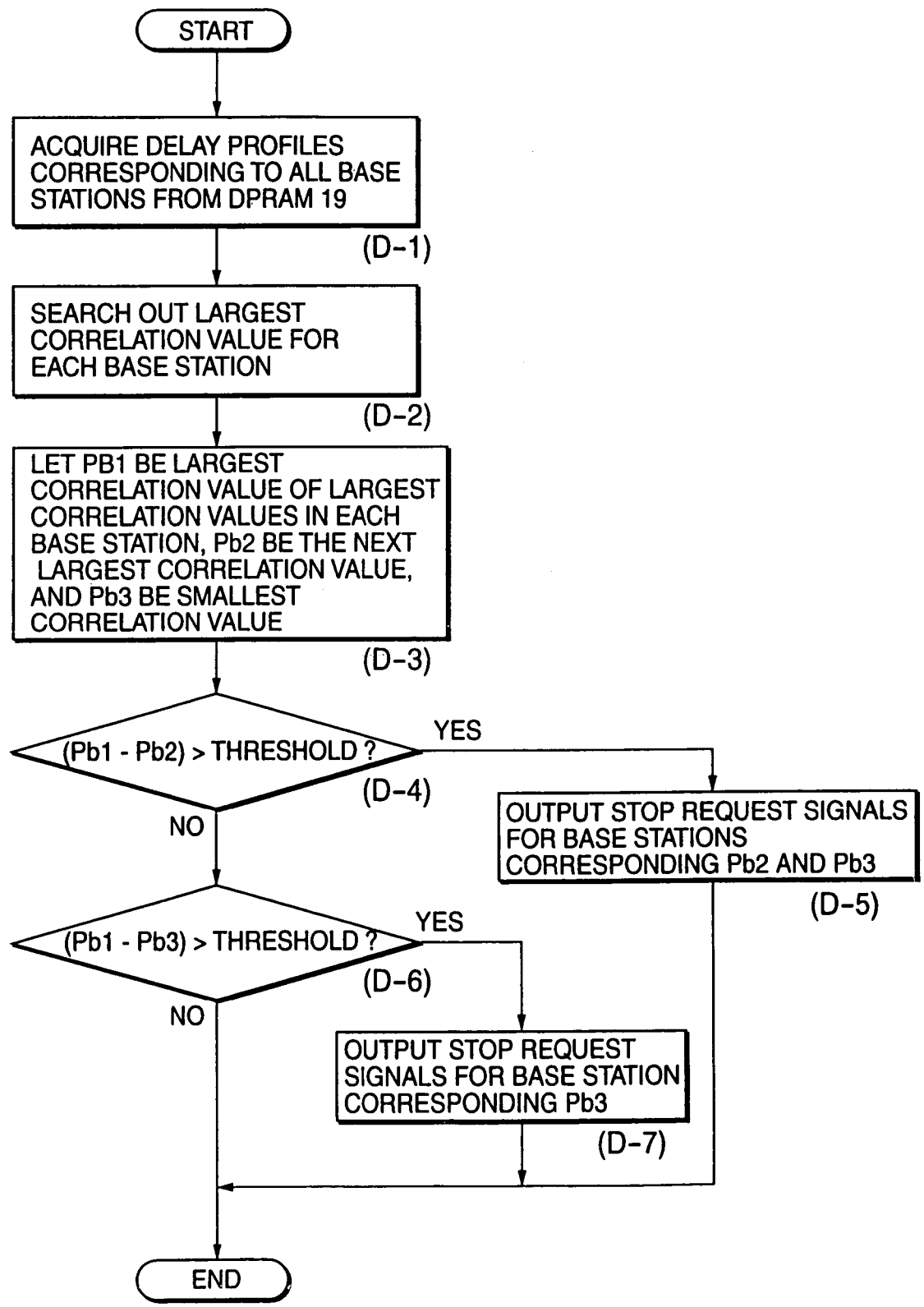
FIG. 15 is a flow chart associated with the processing of outputting a stop request signal from the correlation value detection circuit in FIG. 9.

FIG. 15 is a flow chart showing the processing of outputting a stop request signal from a correlation value detection circuit 26 in FIG. 9 in the third embodiment of the present invention.

The correlation value detection circuit 26 in FIG. 9 reads out 512 delay profiles with different correlation detection timings, corresponding to each base station, from a DPRAM 19 (step D-1), and searches the delay profiles for a delay profile exhibiting the largest correlation value, i.e., the peak correlation value, for each base station (step D-2).

Of the largest correlation values obtained for the respective base stations, the largest value is represented by Pb1; the second largest value, Pb2, and the smallest value, Pb3 (step D-3). The difference (Pb1–Pb2) between Pb1 and Pb2 is then compared with a threshold stored in advance in a RAM 28 (step D-4). If (Pb1–Pb2) is larger than the threshold, stop request signals for the base stations corresponding to Pb2 and Pb3 are output (step D-5).

Upon receiving these stop request signals, a CPU 12 in FIG. 4 outputs the corresponding information over delay profile circuit control signals, and stops supplying operation clocks to computing sections 16 and RAM control circuits 17 for the base stations corresponding to Pb2 and Pb3 by the same processing as that in the first embodiment. The computing sections 16 and RAM control circuits 17 stop operating when the supply of operation clocks is stopped. This makes it possible to reduce power consumption.

In addition, upon receiving the stop request signals, the CPU 12 outputs the corresponding information over timing circuit control signals, and stops supplying operation clocks to count sections 31, comparing sections 32, and signal generating section 33 for the base stations corresponding to Pb2 and Pb3 by the same processing as that in the first embodiment. The count sections 31, comparing sections 32, and signal generating sections 33 stop operating when the supply of operation clocks is stopped. This makes it possible to reduce power consumption.

If it is determined in step D-4 that (Pb1–Pb2) is equal to or smaller than the threshold, the difference (Pb2–Pb3) between Pb2 and Pb3 is compared with the threshold stored in the RAM 28 (step D-6). If (Pb2–Pb3) is larger than the threshold, a stop request signal for the base station corresponding to Pb3 is output (step D-7).

Upon receiving this stop request signal, the CPU 12 in FIG. 4 outputs the corresponding information over delay profile circuit control signals, and stops supplying operation clocks to the computing section 16 and RAM control circuit 17 for the base station corresponding to Pb3 by the same processing as that in the first embodiment. The computing section 16 and RAM control circuit 17 stop operating when the supply of operation clocks is stopped. This makes it possible to reduce power consumption.

Upon receiving the stop request signal, the CPU 12 outputs the corresponding information over timing circuit control signals, and stops supplying operation clocks to the count section 31, comparing section 32, and signal generating section 33 for the base station corresponding to Pb3. The count section 31, comparing section 32, and signal generating section 33 stop operating when the supply of operation clocks is stopped. This makes it possible to reduce power consumption.

Since the processing of restoring operation when a stop request signal is output from the correlation value detection circuit 26 in FIG. 9 in the third embodiment is the same as that shown in FIG. 13, a description thereof will be omitted.

In the third embodiment, the thresholds in steps D-4 and D-6 in FIG. 15 may be set to different values in advance.

In each embodiment described above, both the operations of the delay profile circuit 9 and timing circuit 11 are stopped under a predetermined condition. However, the present invention is not limited to this. The operation of the delay profile circuit 9 or timing circuit 11 may be stopped. Assume that the operation of only the timing circuit 11 is to be stopped. In this case, if it is determined in step B-2 in FIG. 13 that the predetermined period of time has not elapsed, the processing in step A-1 and subsequent steps in FIG. 11 may be performed to determine whether the timing circuit 11 is operated or stopped on the basis of the latest delay profile.

If the searcher circuit 10 is configured to correspond to each of a plurality of base stations from which signals are simultaneously received, its operation may be stopped under a predetermined condition like the delay profile circuit 9 and timing circuit 11.

In each embodiment described above, the supply of operation clocks to the delay profile circuit 9 and timing circuit 11 is stopped under a predetermined condition. However, the present invention is not limited to this. For example, the supply of power to the delay profile circuit 9 and timing circuit 11 may be stopped because it is required to stop the operations of the delay profile circuit 9 and timing circuit 11.

Each embodiment described above is configured to simultaneously receive signals from three base stations. In the present invention, however, the number of base stations from which signals can be simultaneously received is not limited to three. In this case, the number of constituent elements of each of the delay profile circuit 9, searcher circuit 10, and timing circuit 11 is not limited three and may be matched with the number of base stations from which signals can be received.

What is claimed is:

1. A radio communication apparatus in a CDMA communication system comprising:
    a plurality of delay profile circuits for generating delay profiles by calculating correlations between a reception signal and known data at a plurality of timings; and
    timing circuits which are respectively prepared for said delay profile circuits and generate correlation timings in said delay profile circuits,
    wherein operation of at least one of said delay profile circuits which generated the delay profile and said timing circuit for generating a correlation timing in said at least one of said delay profile circuits is stopped in accordance with a correlation value of the delay profile.

2. An apparatus according to claim 1, wherein said plurality of delay profile circuits are used to simultaneously receive signals from a plurality of CDMA transmitters, and operation of at least one of said delay profile circuits which generated the delay profile and said timing circuit for generating a correlation timing in said at least one of said delay profile circuits is stopped in accordance with the correlation value of the delay profile during handover operation of switching from one of said plurality of CDMA transmitters to another CDMA transmitter.

3. An apparatus according to claim 1, wherein when a largest correlation value of the delay profile is smaller than a predetermined threshold, operation of at least one of said delay profile circuits which generated the delay profile and said timing circuit for generating a correlation timing in said at least one of said delay profile circuits is stopped.

4. An apparatus according to claim 2, wherein when a largest correlation value of the delay profile is smaller than a predetermined threshold, operation of at least one of said delay profile circuits which generated the delay profile and said timing circuit for generating a correlation timing in said at least one of said delay profile circuits is stopped.

5. An apparatus according to claim 1, wherein when the number of delay profile circuits is represented by N (N is a natural number satisfying 2<N), and largest correlation values of delay profiles respectively generated by said plurality of delay profile circuits are represented by Pb(N), Pb(N−1), . . . , Pb(1) in decreasing order of values, operation of at least one of said delay profile circuits which generated the delay profile exhibiting the largest correlation value Pb(i) and said timing circuit for generating a correlation timing in said at least one of said delay profile circuits is stopped if (Pb(N)−Pb(i)) (i is a natural number satisfying 1≦i<N) is larger than a predetermined threshold.

6. An apparatus according to claim 2, wherein when the number of delay profile circuits is represented by N (N is a natural number satisfying 2<N), and largest correlation values of delay profiles respectively generated by said plurality of delay profile circuits are represented by Pb(N), Pb(N−1), . . . , Pb(1) in decreasing order of values, operation of at least one of said delay profile circuits which generated the delay profile exhibiting the largest correlation value Pb(i) and said timing circuit for generating a correlation timing in said at least one of said delay profile circuits is stopped if (Pb(N)−Pb(i)) (i is a natural number satisfying 1≦i<N) is larger than a predetermined threshold.

7. An apparatus according to claim 1, wherein when the number of delay profile circuits is represented by N (N is a natural number satisfying 2<N), and largest correlation values of delay profiles respectively generated by said plurality of delay profile circuits are represented by Pb(N), Pb(N−1), . . . , Pb(1) in decreasing order of values, operation of at least one of said delay profile circuits which generated the delay profile exhibiting the largest correlation value Pb(i−1)~(Pb(1) and said timing circuit for generating a correlation timing in said at least one of said delay profile circuits is stopped if (Pb(N)−Pb(I)) (i is a natural number satisfying 1≦i<N) is larger than a predetermined threshold.

8. An apparatus according to claim 2, wherein when the number of delay profile circuits is represented by N (N is a natural number satisfying 2<N), and largest correlation values of delay profiles respectively generated by said plurality of delay profile circuits are represented by Pb(N), Pb(N−1), . . . , Pb(1) in decreasing order of values, operation of at least one of said delay profile circuits which generated the delay profile exhibiting the largest correlation value Pb(i−1)~(Pb(1) and said timing circuit for generating a correlation timing in said at least one of said delay profile circuits is stopped if (Pb(N)−Pb(i)) (i is a natural number satisfying 1≦i<N) is larger than a predetermined threshold.

9. An apparatus according to claim 1, wherein a predetermined period of time during which operation of said at least one of said delay profile circuits is stopped is a natural number multiple of a length of a radio frame of a reception signal.

10. An apparatus according to claim 2, wherein a predetermined period of time during which operation of said at least one of said delay profile circuits is stopped is a natural number multiple of a length of a radio frame of a reception signal.

11. An apparatus according to claim 1, wherein operation of at least one of said delay profile circuits and said timing circuit is stopped by stopping supplying an operation clock to at least one of said delay profile circuits and said timing circuit.

12. An apparatus according to claim 2, wherein operation of at least one of said delay profile circuits and said timing circuit is stopped by stopping supplying an operation clock to at least one of said delay profile circuits and said timing circuit.

13. An apparatus according to claim 1, wherein operation of at least one of said delay profile circuits and said timing circuit is stopped by stopping supplying power to at least one of said delay profile circuits and said timing circuit.

14. An apparatus according to claim 2, wherein operation of at least one of said delay profile circuits and said timing circuit is stopped by stopping supplying power to at least one of said delay profile circuits and said timing circuit.

15. A radio communication apparatus used in a CDMA communication system, comprising:
    an antenna for receiving signals from base stations;
    a radio circuit for performing quadrature detection and modulation with respect to the signals received through said antenna;
    a plurality of delay profile circuits for obtaining delay profiled by calculating correlations between the signals from said radio circuit and known data;

a searcher circuit for selecting a delay profile exhibiting a large correlation value from the plurality of delay profiles obtained by said delay profile circuits, and outputting a signal on which a despreading timing is based;

a plurality of timing circuits for outputting pulse signals representing correlation timings in said delay profile circuits on the basis of the signal from said searcher circuit;

a CPU for controlling operations of said delay profile circuits and said timing circuits; and an operation clock generating circuit for generating and outputting operation clocks for operating said delay profile circuits and said timing circuits, wherein when a largest correlation value of the delay profile is smaller than a predetermined threshold, a stop request signal for stopping operation of at least one of said delay profile circuits that generated the delay profile is output from said searcher circuit to said CPU, and said CPU performs control to stop operation of at least one of said delay profile circuits corresponding thereto upon receiving the stop request signal.

16. An apparatus according to claim 15, wherein when a predetermined period of time has elapsed after said searcher circuit outputs the stop request signal, said searcher circuit stops outputting the stop request signal.

17. An apparatus according to claim 15, wherein operation of at least one of said delay profile circuits and said timing circuit is stopped by stopping supplying an operation clock to at least one of said delay profile circuits and said timing circuit.

18. An apparatus according to claim 15, wherein operation of at least one of said delay profile circuits and said timing circuit is stopped by stopping supplying power to at least one of said delay profile circuits and said timing circuit.

19. A power consumption control method for a radio communication apparatus which is used in a CDMA communication system and has a plurality of delay profile circuits for generating delay profiles by calculating correlations between a reception signal and known data at a plurality of timings, comprising:

comparing a largest correlation value of the delay profile with a predetermined threshold; and stopping operation of at least one of said delay profile circuits on the basis of the comparison result obtained in the comparison step.

20. A method according to claim 19, wherein stopping comprises stopping operation of said at least one of said delay profile circuits when the largest correlation value is smaller than the predetermined threshold.

21. A method according to claim 19, further comprising:

detecting whether a predetermined period of time elapses while operation of said at least one of said delay profile circuits is stopped; and resuming the operation of said at least one of said delay profile circuits when a lapse of the predetermined period of time is detected.

22. A power consumption control method for a radio communication apparatus which is used in a CDMA communication system and has a plurality of delay profile circuits for generating delay profiles by calculating correlations between a reception signal and known data at a plurality of timings and timing circuits prepared for the respective delay profile circuits to generate correlation timings therein, comprising:

comparing a largest correlation value of the delay profile with a predetermined threshold; and stopping operation of at least one of said delay profile circuits on the basis of the comparison result obtained in the comparing.

23. A power consumption control method for a radio communication apparatus which is used in a CDMA communication system and has a plurality of delay profile circuits for generating delay profiles by calculating correlations between a reception signal and known data at a plurality of timings and timing circuits prepared for the respective delay profile circuits to generate correlation timings therein, comprising:

comparing a largest correlation value of the delay profile with a predetermined threshold;

stopping operation of at least one of said delay profile circuits on the basis of the comparison result obtained in the comparing; and stopping operation of at least one of said timing circuits on the basis of the comparison result obtained in the comparing.

* * * * *